US008525924B2

(12) United States Patent
Jannard

(10) Patent No.: US 8,525,924 B2
(45) Date of Patent: *Sep. 3, 2013

(54) MODULAR MOTION CAMERA

(75) Inventor: James H. Jannard, Las Vegas, NV (US)

(73) Assignee: Red.Com, Inc., Irvine, CA (US)

( * ) Notice: Subject to any disclaimer, the term of this patent is extended or adjusted under 35 U.S.C. 154(b) by 592 days.

This patent is subject to a terminal disclaimer.

(21) Appl. No.: 12/345,437

(22) Filed: Dec. 29, 2008

(65) Prior Publication Data

US 2010/0165138 A1 Jul. 1, 2010

(51) Int. Cl.
*H04N 5/225* (2006.01)

(52) U.S. Cl.
USPC .................. 348/373; 348/372; 348/374

(58) Field of Classification Search
None
See application file for complete search history.

(56) References Cited

U.S. PATENT DOCUMENTS

| | | | |
|---|---|---|---|
| 3,295,425 A | 1/1967 | Bing et al. | |
| 4,281,909 A | 8/1981 | Ishibashi et al. | |
| 4,420,240 A | 12/1983 | Katsuma et al. | |
| 4,507,689 A | 3/1985 | Kozuki et al. | |
| 4,746,990 A | 5/1988 | Katoh et al. | |
| 4,769,665 A * | 9/1988 | Dagborn | 396/213 |
| 4,873,580 A * | 10/1989 | Katoh et al. | 386/224 |
| 4,924,246 A | 5/1990 | Yamada | |
| 5,016,034 A | 5/1991 | Goto | |
| 5,132,800 A | 7/1992 | Wada et al. | |
| 5,189,520 A | 2/1993 | Okayasu et al. | |
| 5,221,964 A * | 6/1993 | Chamberlain et al. | 348/373 |
| 5,469,211 A | 11/1995 | Maruichi et al. | |
| 5,844,604 A | 12/1998 | Myeong | |
| 6,903,766 B1 | 6/2005 | Silverbrook et al. | |
| 7,327,396 B2 * | 2/2008 | Schultz et al. | 348/375 |
| 7,466,360 B2 | 12/2008 | Lee | |
| 7,518,654 B2 * | 4/2009 | Bleau et al. | 348/373 |
| 7,532,249 B2 | 5/2009 | Schultz et al. | |
| 7,576,776 B2 | 8/2009 | Silverbrook et al. | |
| 8,019,216 B2 | 9/2011 | Jannard | |
| 8,174,560 B2 | 5/2012 | Jannard et al. | |
| 8,237,830 B2 | 8/2012 | Jannard et al. | |
| 8,290,360 B2 | 10/2012 | Jannard | |
| 8,358,357 B2 | 1/2013 | Jannard et al. | |
| 2004/0032506 A1 * | 2/2004 | Silverbrook et al. | 348/207.99 |

(Continued)

FOREIGN PATENT DOCUMENTS

| | | |
|---|---|---|
| CN | 2772066 | 4/2006 |
| DE | 4304506 | 8/1994 |

(Continued)

OTHER PUBLICATIONS

International Search Report and Written Opinion for Application No. PCT/US2009/069316, mailed Jan. 3, 2010 in 12 pages.

(Continued)

*Primary Examiner* — Roberto Velez
*Assistant Examiner* — Abdelaaziz Tissire
(74) *Attorney, Agent, or Firm* — Knobbe Martens Olson & Bear LLP

(57) ABSTRACT

Modular digital motion camera systems are disclosed. Individual modules may be removed from the system and replaced, such as to benefit from upgraded technology, while preserving the remaining modules in the system. The modules may be disassembled and reconstructed to convert the physical form of the camera, such as between ENG configurations, DSLR configurations and studio configurations. Universal lens mount modules are provided, to enable use of lens systems from a variety of commercial manufacturers.

15 Claims, 2 Drawing Sheets

(56) References Cited

U.S. PATENT DOCUMENTS

| | | | |
|---|---|---|---|
| 2004/0198101 | A1 | 10/2004 | Rapp |
| 2005/0073587 | A1 | 4/2005 | Silverbrook |
| 2007/0098385 | A1* | 5/2007 | Tanaka et al. .................. 396/56 |
| 2007/0126871 | A1 | 6/2007 | Henninger et al. |
| 2007/0126872 | A1 | 6/2007 | Bolotine et al. |
| 2008/0219659 | A1 | 9/2008 | Tian |
| 2009/0073300 | A1 | 3/2009 | Chung |
| 2009/0231483 | A1 | 9/2009 | Seddik |
| 2009/0316038 | A1 | 12/2009 | Schmack et al. |
| 2010/0111489 | A1 | 5/2010 | Presler |
| 2010/0165188 | A1 | 7/2010 | Jannard |
| 2012/0294582 | A1 | 11/2012 | Jannard et al. |

FOREIGN PATENT DOCUMENTS

| | | | |
|---|---|---|---|
| DE | 4304506 A1 * | 8/1994 | |
| DE | 195 47 166 | 6/1996 | |
| DE | 20220067 | 4/2003 | |
| EP | 0 225 408 | 6/1987 | |
| EP | 0574105 | 12/1993 | |
| GB | 2 026 187 | 1/1980 | |
| WO | WO 2007/036308 | 5/2007 | |
| WO | WO 2008/128205 | * 10/2008 | |

OTHER PUBLICATIONS

Beacham, Frank. "RED's Modular Camera Breaks New Ground". TV Technology. May 14, 2010 <http://www.tvtechnology.com/article/71794>.

Official Communication in Application No. MX/a/2011/006941, dated Jun. 25, 2012 in 3 pages.

Official Communication in Application No. 593362, mailed Sep. 14, 2012 in 2 pages.

Official Communication in Application No. 201104749-5, mailed Jul. 31, 2012 in 7 pages.

Official Communication in European Application No. 09801886, dated Aug. 18, 2011.

Intent to Grant in European Application No. 09801886, dated Jul. 16, 2012.

Official Communication in European Application No. 09801886, dated Feb. 19, 2013.

International Preliminary Report on Patentability in Application No. PCT/US2009/069316, dated Jun. 29, 2011 in 6 pages.

Complaint for Patent Infringement, U.S. District Court for the Southern District of California (Case: 3:13-cv-00334-DMS-BGS), filed "Feb. 12, 2013".

European Search Report in European Application No. 12198429.8, dated Mar. 6, 2013.

European Search Report in European Application No. 12198444.7, dated Mar. 7, 2013.

U.S. Appl. No. 13/566,924, filed Aug. 3, 2012, Jannard et al.

* cited by examiner

MODULAR MOTION CAMERA

BACKGROUND OF THE INVENTION

Digital motion cameras include a series of functional components including lenses, optical filters, one or more electronic image sensor arrays, electronic circuits to capture, process and store images from the image sensor array, internal or external memory devices to store and transfer image files, power supplies and a display system to preview the captured images. These components are typically highly integrated and interdependent, from each of an optical, electronics and physical perspective. Generally external lenses and power supplies may be removably carried by the camera. But the remaining components are typically permanently integrated into a main framework or housing without any practical ability to be removed and replaced. As a consequence, the performance and functionality of these cameras are limited by the least advanced component or the first component to malfunction. In addition, these cameras are not upgradeable with updated technology and must instead be replaced in their entirety in order to obtain the benefit of technological improvements in only a single component part.

Thus, notwithstanding the various digital motion camera options available in the art, there remains a need for a camera system that is fully customizable by the user, and which overcomes the limitations discussed above.

SUMMARY OF THE INVENTION

The present invention provides a fully modular digital motion camera system. Each module may be removed from the system and replaced, for example, by an upgraded technology module, while preserving the functionality of the remainder of the system.

In addition, the modules may be disconnected and reassembled by the user to rapidly change the physical configuration of the system. The various electronics modules may be connected to each other or stacked in any sequence and in a wide variety of geometries, to enable reconfiguration of the system to suit the user's preference.

For example, the modular motion camera system may be assembled in a DSLR mode such as for use with a shoulder mount. The system may be disassembled and reassembled in an electronics news gathering (ENG) mode, or into a studio configuration, such as for use on a tripod or crane. Reconfiguration can be accomplished to move the center of gravity forward or backward along the viewing axis, and any of a variety of support hardware such as grips, bars, or frames may be readily connected to the modular system, as may be appropriate for the assembled configuration.

There is provided in accordance with one aspect of the present invention, a modular motion camera. The camera comprises a sensor module, having a first interface. A power module is provided having a second and third interface, and a recording module is provided, having a fourth and fifth interface. The first interface is functionally engageable with at least any of the second and fourth interfaces. In this manner, the power module, recording module, and other optional modules may be stacked in any order on the sensor module.

The power module includes a recording bus extending between the second and third interface, for transmitting motion picture image data through the power module. The recording module includes a power bus extending between the fourth and fifth interface, for transmitting power through the recording module.

Preferably, the modular motion camera additionally comprises an in/out module having a sixth and seventh interface. The sixth interface is engageable with at least the first interface, and the seventh interface is engageable with at least the second interface. In this manner, the power module, recording module and in/out module may be stacked in any order on the sensor module.

Preferably, a user interface module is additionally provided. The user interface module may include an eighth interface, which may be engageable with any other interface in the system. In one implementation of the invention, the user interface module comprises an eighth interface which is engageable with any of the third and fifth interface. The user interface may additionally comprise a transceiver for wireless communication with other devices, such as the sensor module. The user interface may therefore be functionally associated with but physically detached from the modular motion camera system.

In one implementation, the modular motion camera further comprises at least a second power module, the second power module having a ninth and tenth interface. The second power module preferably comprises a recording bus extending between the ninth and tenth interface, for transmitting motion picture image data through the second power module. The second power module preferably also comprises a control bus extending between the ninth and tenth interface, for transmitting control signals through the second power module.

The module motion camera system preferably additionally comprises a lens mount module, releasably connectable to the sensor module.

In accordance with a further aspect of the present invention, there is provided a modular motion camera. The camera comprises a sensor module having a first bus segment, a recording module having a second bus segment, and a power module having a third bus segment. Each of the modules is releasable connectable to any other of the modules, such that every assembled configuration of the modules places the bus segments in communication with each other in a manner that permits functional electrical communication among each of the modules.

The modular motion camera system preferably additionally comprises an in/out module having a fourth bus segment, that is directly connectable with any of the other bus segments.

In accordance with a further aspect of the present invention, there is provided a modular, convertible motion camera. The camera comprises a sensor module, a recording module, a power module, and a user interface module. Each module is directly or indirectly releasably connectable to the sensor module in a first construct to produce a camera having an ENG configuration, and at least one or two and preferably each module maybe disconnected and reassembled into a second construct, having a DSLR configuration.

In accordance with a further aspect of the present invention, there is provided a modular convertible motion camera system. The system includes a sensor module, a recording module, a power module and a user interface module. Each module is directly or indirectly releasably connectable to the sensor module in a first construct to produce a motion camera having an ENG configuration, and at least one or two and preferably each module may be disconnected and reassembled into a second construct having a studio configuration.

In accordance with a further aspect of the present invention, there is provided a modular, convertible motion camera. The camera comprises a sensor module, a recording module, a power module, and a user interface module. Each module is directly or indirectly releasable connectable to the sensor module in a first construct, to produce a motion camera having a studio configuration, and at least one or two and preferably each module may be disconnected and reassembled into a second construct having a DSLR configuration.

In accordance with a further aspect of the present invention, there is provided a modular, multi-component convertible motion camera. The modular camera comprises a sensor module, a recording module, a power module, and a user interface module. Each module is directly or indirectly releasably connectable to the sensor module in a first construct to produce a motion camera having an ENG configuration, and each module may be disconnected and reassembled into a second construct having a DSLR configuration, and each module may be disconnected and reassembled into a third construct having a studio configuration.

In accordance with a further aspect of the present invention, there is provided a modular motion camera subassembly. The subassembly comprises a sensor module, having a sensor, digital signal processing electronics, and a back focal distance of no more than about 16 mm. The sensor module is configured for connection to an external recording module and an external power module.

There is provided in accordance with a further aspect of the present invention a module motion camera system configured for operation with any of a plurality of lenses having different focal lengths. The system comprises a sensor module, having an interface for removably receiving a lens mount module. At least a first and a second lens mount module are removably connectable to the interface, each lens mount module having a different focal length. Each lens mount module focal length is selected so that it can be mounted to the sensor module and added to the back focal length of the modular motion camera system, to produce an overall focal length of the system. The overall focal length of the system may be any of a variety of lengths, including 17 mm, 35 mm, 46 mm, 48 mm, 52 mm, or other focal length. In one implementation of the invention, the back focal length is no more than about 16 mm.

The modular motion camera system preferably additionally comprises digital signal processing electronics in the sensor module. The sensor module may further comprise an interface for removably receiving a functional module. The functional module may comprise any one or more of a recording module, a power module, an in/out module, and a user interface module.

DETAILED DESCRIPTION OF THE PREFERRED EMBODIMENT

Figure 1:
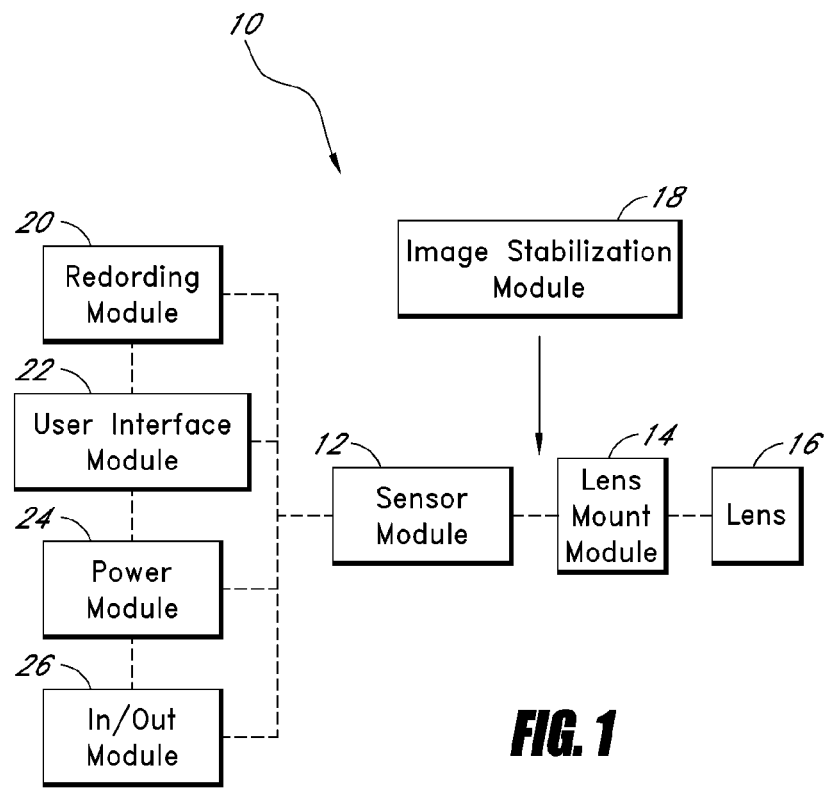
FIG. 1 is a schematic representation of various modules in the modular camera system.

Referring to FIG. 1, there is schematically illustrated a modular camera system 10 in accordance with the present invention. Although the camera system will be primarily described herein as a motion camera system, it is to be understood that the principals of the present invention are applicable to digital still cameras as well as digital still and motion cameras (DSMC). In addition, the description herein will be primarily directed to the physical electronics and optical modules of the present camera systems. However, additional modules, components and accessories are also contemplated in the systems of the present invention. These include, for example, any or combinations of lenses; lens mounts; stabilization modules or features; neutral density filters and modules containing neutral density filters; sensor modules with or without separate electronics modules; user interface modules; input/output modules; various system bus configurations; recording modules; various displays such as LCD displays; electronic view finders and handles. The camera of the present invention may also be provided with or compatible with rails, rods, shoulder mounts, tripod mounts, helicopter mounts, matte boxes, follow focus controls, zoom controls, and other features and accessories known in the art.

The modular camera system 10 includes a sensor and electronics module 12. The image sensor contained within the sensor module 12 may comprise any of a variety of video sensing devices, including, for example, CCD, CMOS, vertically stacked CMOS devices such as the FOVEON® sensor, or a multi-sensor array using a prism to divide light between the sensors. In some embodiments, the image sensor can include a CMOS device having about 12 million photocells. However, other size sensors can also be used.

In some configurations, the camera can be configured to output video at "2 k" (e.g., 2048×1152 pixels), "4 k" (e.g., 4,096×2,540 pixels), "4.5 k" horizontal resolution or greater resolutions. As used herein, in the terms expressed in the format of xk (such as 2 k and 4 k noted above), the "x" quantity refers to the approximate horizontal resolution. As such, "4 k" resolution corresponds to about 4000 or more horizontal pixels and "2 k" corresponds to about 2000 or more pixels. The sensor can range from as small as about 0.5 inches (8 mm), ⅔ inches, S35 (cine), 35 mm full frame still and 645, but it can be at least about 1.0 inches, 6 cm×17 cm or larger. In one series of sensor modules, sensors are contemplated having sizes of at least about 10.1×5.35 mm; 24.4×13.7 mm; 30×15 mm; 36×24 mm; 56×42 mm and 186×56 mm. Additionally, the image sensor can be configured to provide variable resolution by selectively outputting only a predetermined portion of the sensor. For example, the sensor and/or the image processing module can be configured to allow a user to identify the resolution of the image data output.

The camera can also be configured to downsample and subsequently process the output of the sensor to yield video output at 2K, 1080 p, 720 p, or any other resolution. For example, the image data from the sensor can be "windowed", thereby reducing the size of the output image and allowing for higher readout speeds. Alternatively, sensor modules having different sensor sizes may be exchanged depending upon the desired effect. Additionally, the camera can be configured to upsample the output of the sensor to yield video output at higher resolutions. In some embodiments, the sensor can include a Bayer pattern filter. As such, the sensor, by way of its chipset (not shown) outputs data representing magnitudes of red, green, or blue light detected by individual photocells of the image sensor. Any of a variety of sensor sizes or other sensor characteristics may be utilized in the modular camera system of the present invention.

The electronics contained in the sensor and electronics module 12 are digital signal processing electronics for processing image data captured by the sensor. The sensor module may be configured to deliver any of a variety of desired performance characteristics. For example, light received by the sensor may be converted into raw digital image data at a rate of at least about 23 frames per second, wherein the raw data is compressed and recorded at a rate of at least about 23 frames per second into the recording module 20. The camera 10 can include a separate compression module, or the compression electronics can be carried within the sensor module 12. The compression electronics can be in the form of a separate chip or it can be implemented with software and another processor. For example, the compression electronics can be in the form of a commercially available compression chip that performs a compression technique in accordance with the JPEG 2000 standard, or other compression techniques.

The sensor module 12 can be configured to perform any type of compression process on the data from the sensor. In some embodiments, the sensor module 12 performs a compression technique that takes advantage of the techniques performed by the image processing system. For example, the image processing system can be configured to reduce the magnitude of the values of the red and blue data by subtracting the magnitudes of green image data, thereby resulting in a greater number of zero values, as well as other effects. Additionally, the image processing system can perform a manipulation of raw data that uses the entropy of the image data. Thus, the compression technique performed by the sensor module 12 can be of a type that benefits from the presence of larger strings of zeros to reduce the size of the compressed data output therefrom.

Further, the sensor module 12 can be configured to compress the image data from the sensor to result in a visually lossless output. The sensor module can be configured to apply any known compression technique, such as, but without limitation, JPEG 2000, MotionJPEG, any DCT based codec, any codec designed for compressing RGB image data, H.264, MPEG4, Huffman, or other techniques.

Depending on the type of compression technique used, the various parameters of the compression technique can be set to provide a visually lossless output. For example, many of the compression techniques noted above can be adjusted to different compression rates, wherein when decompressed, the resulting image is better quality for lower compression rates and lower quality for higher compression rates. Thus, the compression capability can be configured to compress the image data in a way that provides a visually lossless output, or can be configured to allow a user to adjust various parameters to obtain a visually lossless output. For example, the sensor module 12 can be configured to compress the image data at a compression ratio of about 6:1, 7:1, 8:1 or greater. In some embodiments, the sensor module 12 can be configured to compress the image data to a ratio of 12:1 or higher.

Additionally, the sensor module 12 can be configured to allow a user to adjust the compression ratio. For example, the camera 10 can include a user interface such as on a user interface module 22 that allows a user to input commands that cause the sensor module 12 to change the compression ratio. Thus, in some embodiments, the camera 10 can provide for variable compression.

As used herein, the term "visually lossless" is intended to include output that, when compared side by side with original (never compressed) image data on the same display device, one of ordinary skill in the art would not be able to determine which image is the original with a reasonable degree of accuracy, based only on a non-magnified visual inspection of the images. Additional aspects of the preferred compressed raw onboard image data handling capabilities are disclosed in U.S. patent application Ser. No. 12/101,882, filed Apr. 11, 2008, entitled Video Camera, to Jannard et al., the entirety of which is hereby incorporated by reference herein.

The sensor module 12 is provided with a lens mount module interface for releasably connecting to a complementary sensor module interface on a lens mount module 14. The lens mount module 14 is provided with a lens interface for releasable connection to a complementary interface on a lens 16.

The modular camera system 10 is preferably configured to cooperate with any of a variety of commercially available lens systems from a variety of lens manufacturers. Thus, a plurality of lens mount modules 14 may be provided, each having a sensor module interface for releasable connection to the sensor module 12, and each having a unique lens interface such as RED-Mount (Red Digital Cinema Camera Company); PL Mount; Canon Mount; Nikon Mount; Medium Format Mount; Mamiya Mount; RED 617 Mount; Linhof Mount; or Alpa Mount.

The lens mount interface on lens mount module 14 is preferably also configured to receive any of a plurality of different types of lens systems from the same lens mount type for example, but without limitation, various sizes of lens systems including a 50-100 millimeter (F2.8) zoom lens, an 18-50 millimeter (F2.8) zoom lens, a 300 millimeter (F2.8) lens, 15 millimeter (F2.8) lens, 25 millimeter (F1.9) lens, 35 millimeter (F1.9) lens, 50 millimeter (F1.9) lens, 85 millimeter (F1.9) lens, and/or any other lens. Each lens mount module is customized to a corresponding lens or lenses such that despite which complementary lens mount module—lens assembly is attached thereto, images can be properly focused upon a light-sensitive surface of the image sensor in sensor module 12.

The focal distance of the modular camera system is the linear distance along the optical path between the lens mount module lens interface and the sensor surface. This includes the sum of the back focal distance within the sensor module, and the focal distance of the lens mount module. A plurality of lens mount modules may be provided, for cooperating with the modular camera system, each lens mount configured to attach a commercially available lens onto the modular camera system of the present invention. Lens mount modules in accordance with the present invention will have focal lengths such that the total focal length of the complementary lens mount module and sensor module is about 17 mm, 35 mm, 46 mm, 48 mm, 52 mm, or other desired focal length. Preferably, the back focal length of the sensor module is no more than about 16, in some embodiments no more than about 14, and, in one embodiment, is about 12 mm.

The precalibrated, modular aspect of the present invention enables a user to construct a modular camera with, for example, a first sensor module having a first, smaller sensor size. When a larger sensor is desired, the user may uncouple the lens mount module and the electronics modules from the sensor module with the first sensor size, and reassemble the modular system using a second sensor module having a second, larger sensor size. All of the reassembled modules with the second sensor module are automatically calibrated for seamless functioning without the need for extra calibration or adjustment steps. This allows the user to upgrade the sensor without the need to purchase a new camera or camera system. The same exchange/upgrade capability exists with respect to each of the modules in the system of the present invention.

An optional image stabilization module 18 may be provided, to enable image stabilization as is understood in the art. In one implementation of the invention, the image stabilization module 18 is configured for connection in between the sensor module 12 and the lens mount module 14.

The remaining modules of the modular camera system 10 may be connected in any order to each other, and/or to the sensor module 12. Modules presently contemplated for use with the camera system of the present invention include at least one recording module 20, at least one user interface module 22, at least one power module 24 and at least one input/output module 26.

The recording module 20 may include any of a variety of memory technologies, such as hard drives, spinning drives, flash memory, solid state drives, RAID drives, optical discs, or others that may be developed in the art. As with other modules in the present system, the particular media used in the current module is deemphasized in importance compared to some of the prior art systems, since the module may be simply removed and replaced as upgraded technology becomes available.

In some embodiments, the size of the storage device can be sufficiently large to store image data from the compression circuitry corresponding to at least about 30 minutes of video at 12 mega pixel resolution, 12-bit color resolution, and at 60 frames per second. However, the storage device can have any desired size. In one implementation of the invention, recording module 20 includes one or two or more 2.5" 160 GB laptop hard drives arranged in a hardware based RAID.

In some embodiments, the recording module can be mounted on an exterior of the modular camera. Secondary storage devices can be carried by additional recording modules, attached to or external to the camera. The storage device can be connected to the other components through standard or custom communication ports, including, for example, but without limitation, Ethernet, USB, USB2, USB3, IEEE 1394 (including but not limited to FireWire 400, FireWire 800, FireWire S3200, FireWire S800T, i.LINK, DV), SATA and SCSI. Further, in some embodiments, the storage device can comprise a plurality of hard drives, such as those operating under a RAID protocol. However, any type of storage device can be used.

The user interface 22 includes any of a variety of standard user interface features, such as a viewing screen for viewing sampled images and controls for operating the camera. The screen may be a touch screen, with integrated controls, or separate controls such as knobs, keypads and the like may be used.

In some embodiments, the user interface 22 and/or the sensor module 12 can include a subsampling system configured to output reduced resolution image data to the monitor on user interface module 22. For example, such a subsampling system can be configured to output video image data to support 2K, 1080 p, 720 p, or any other resolution. In some embodiments, filters used for demosaicing can be adapted to also perform downsampling filtering, such that downsampling and filtering can be performed at the same time. The sensor module 12 can be configured to perform any type of demosaicing process to the data from the sensor. Thereafter, demosaiced image data can be displayed on the monitor.

The display on user interface module 22 can include any type of monitoring device. For example, but without limitation, the display can be a four-inch LCD panel supported by the user interface 22. In some embodiments, the display can be connected to an infinitely adjustable mount configured to allow the display to be adjusted to any position relative to the housing of the user interface module 22 so that a user can view the display at any angle relative to the camera 10. In some embodiments, the display can be connected to the monitor module through any type of video cables such as, for example, an RGB or YCC format video cable.

Preferably, the user interface 22 includes a wireless transceiver, for wireless communication with the sensor module 12. This is in parallel with a hard-wired bus within the user interface 22, for connection physically into the system, as will be discussed. This enables the user interface 22 to either be mounted directly to and hardwired to the modular camera, or removed from the modular camera and operated remotely, to control the camera functionality.

In certain implementations of the invention, the modular camera is functional in each of a digital still and motion mode (DSMC). In this mode, the user interface is preferably configured such that it displays the appropriate settings, controls and feedback for motion when the camera is used as a motion camera, and the user interface 22 automatically switches to preconfigured display and control mode when the camera is utilized in a still picture mode. The display and controls may be automatically toggled between the motion mode and the still mode in response to manipulation of a control, such as a first switch or button for activating motion mode filming and a second switch or button for activating still shooting. In this manner, the photographer may toggle as desired between still shooting and motion shooting by simply selecting the right shutter control, and the user interface automatically reconfigures or toggles back and forth between the appropriate feedback and controls. The shutter control switch may be any of a variety of trigger switches, push buttons, toggle switches, slider switches, knobs, touch screen sensors or other switches as is known in the art. The first and second switches may be located adjacent each other, and may be differentiated such as by a different size, shape, texture or elevation from the adjacent portion of the modular body to which the controls are mounted.

For example, a user might set still shooting preferences such as 5K, ISO 500, Aperture Priority, F5.6, Average Metering, Continuous Auto Focus Mode, 5 FPS, and a software choice. Any of these variables may be modified as desired, until the user has set desired preferences for a particular application. For shooting motion in the same setting, the user might select 4K, ISO 500, Manual Exposure Adjustment, 60 FPS and a different software choice. Both sets of settings are retained in the camera. If the user hits the 'still' record button, all of the still preferences are implemented and/or displayed on the LCD or other monitor. If the user then hits the 'motion' record button, the camera automatically implements and/or displays the preselected motion associated preferences, so that the user does not have to manually reconfigure the camera settings. Preferably the user can distinguish the motion and still record controls such as through tactile feedback or other mechanism so that he can switch modes without needing to look away from the monitor or EVF.

The power module 24 may include any of a variety of known power supplies, such as batteries, fuel cells, solar, line input such as from a transformer or studio power or other source or combinations thereof. Typically, conventional rechargeable batteries will be used. The modular camera system 10 may be provided with one or two or three or four or more power modules 24, which may be stacked onto the modular assembly in any order, relative to the other modules, depending upon the desired physical configuration of the system. Power module 24 will often be the heaviest of the various modules. As a consequence, shifting the power modules 24 in a forward direction or a rearward direction relative to the other modules along the optical axis of the system will change the center of gravity of the system. This may be utilized to optimize the balance in the camera for the intended configuration, such as when configured in a DSLR mode versus an ENG mode, and/or to provide desired balance for use with a larger or small lens.

A further option for the modular camera system of the present invention is the provision of one or two or three or more dummy modules (not illustrated) which are physically capable of connecting into the module stack, and include internal electronics to complete the bus through the dummy module, such as when the dummy module or modules are positioned closer to the sensor module than the rear of the stack. The dummy module preferably comprises a module housing with through bus wiring but no additional weight or electronics, or a predetermined weight rating. This enables a further shifting of the center of gravity of the overall system, as may be desired for specialty configurations. In addition, the use of one or more dummy modules enables the remaining modules to be repositioned relative to the sensor module, which may be desirable as described below.

As referenced above, the modular camera in accordance with the present invention may be interchangeably configurable for motion shooting, still shooting, or DSMC (digital stills and motion) loads. For digital still photography, an input/output module 26 may or may not be utilized depending upon user preference. However, when shooting in motion mode, an in/out module 26 is preferably provided. As with the other modules in the system, the in/out module 26 is configured for attachment in any order directly or indirectly to the sensor module 12.

As is understood in the motion picture arts, motion picture cameras are often mounted and used in environments where supporting frames, cables, rails, rods, shoulder mounts, tripod mounts and other equipment are closely packed into small or tight spaces. As a consequence, the ability of the in/out module 26 to be moved forward or backwards along the optical axis relative to the other modules provides the valuable benefit of allowing input/output cables connected to module 26 to be repositioned in a way that minimizes the obstruction by adjacent cables and structures. This may be accomplished both by rearranging the functional modules described above, as well as by the positioning of one or more dummy modules in the module stack.

Figure 2:
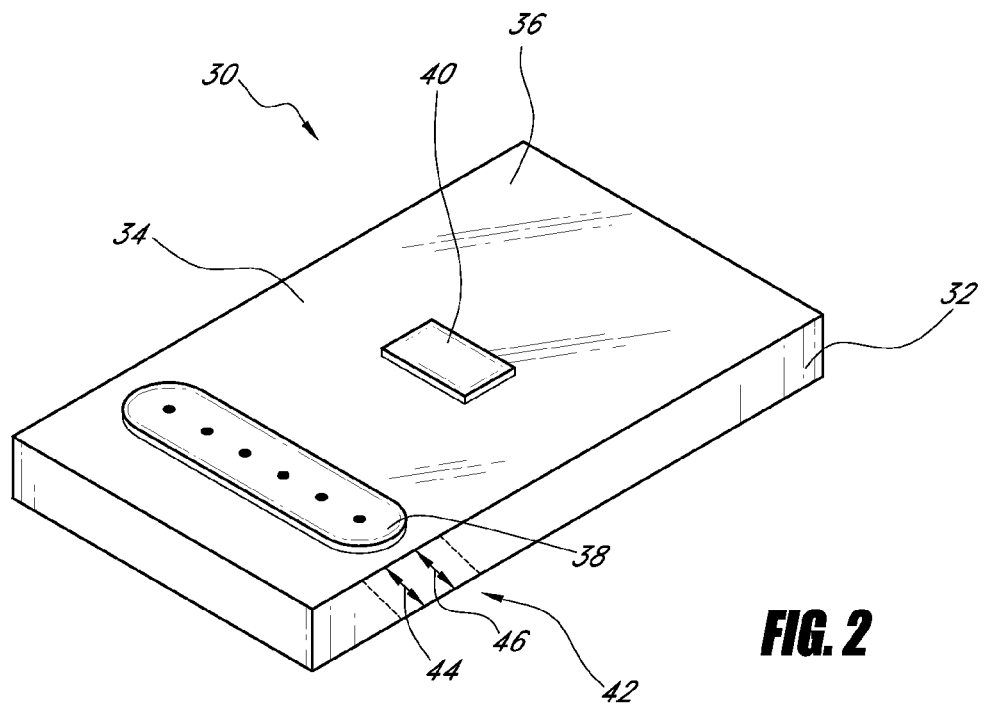
FIG. 2 is a schematic representation of a single module.

Referring to FIG. 2, there is illustrated a schematic view of a single module in accordance with the present invention. The module of FIG. 2 may be any of the electronics modules described above. This is distinguished from the optics modules such as the sensor module 12, lens mount module 14, and, if present, image stabilization module 18, which are configured to receive an optical signal.

Referring to FIG. 2, the module 30 includes a housing 32. The housing 32 is provided with at least a first interface 34, for releasable connection to an adjacent module. As will be appreciated in view of the foregoing, the housing 32 is preferably provided with two or more interfaces, to enable the module to be positioned within and electrically and mechanically engaged within a stack between two other modules. The first and second interface may be provided on opposite surfaces of the module, or may be provided on adjacent surfaces of the module, such as to enable stacking of modules in a non-linear configuration.

In the illustrated embodiment, a first interface 34 is provided on a first surface 36 of the housing 32 and a second interface (not shown) is preferably provided on a second, opposite surface of the housing which is not visible in FIG. 2.

The interface comprises a multi-function electrical connector 38, for providing electrical communication with the adjacent module. The interface additionally comprises a mechanical connector 40, for facilitating mechanical releasable locking of the adjacent modules. Alternatively, the multi-function electrical connector can additionally be utilized to perform mechanical interlocking between adjacent modules.

As represented by the dashed lines, the module 30 may further include a bus segment 42. The bus segment 42 can include a power bus 44 for communicating power through the module 30 and a recording bus 46 for transmitting motion picture image data through the module 30.

Figure 3:
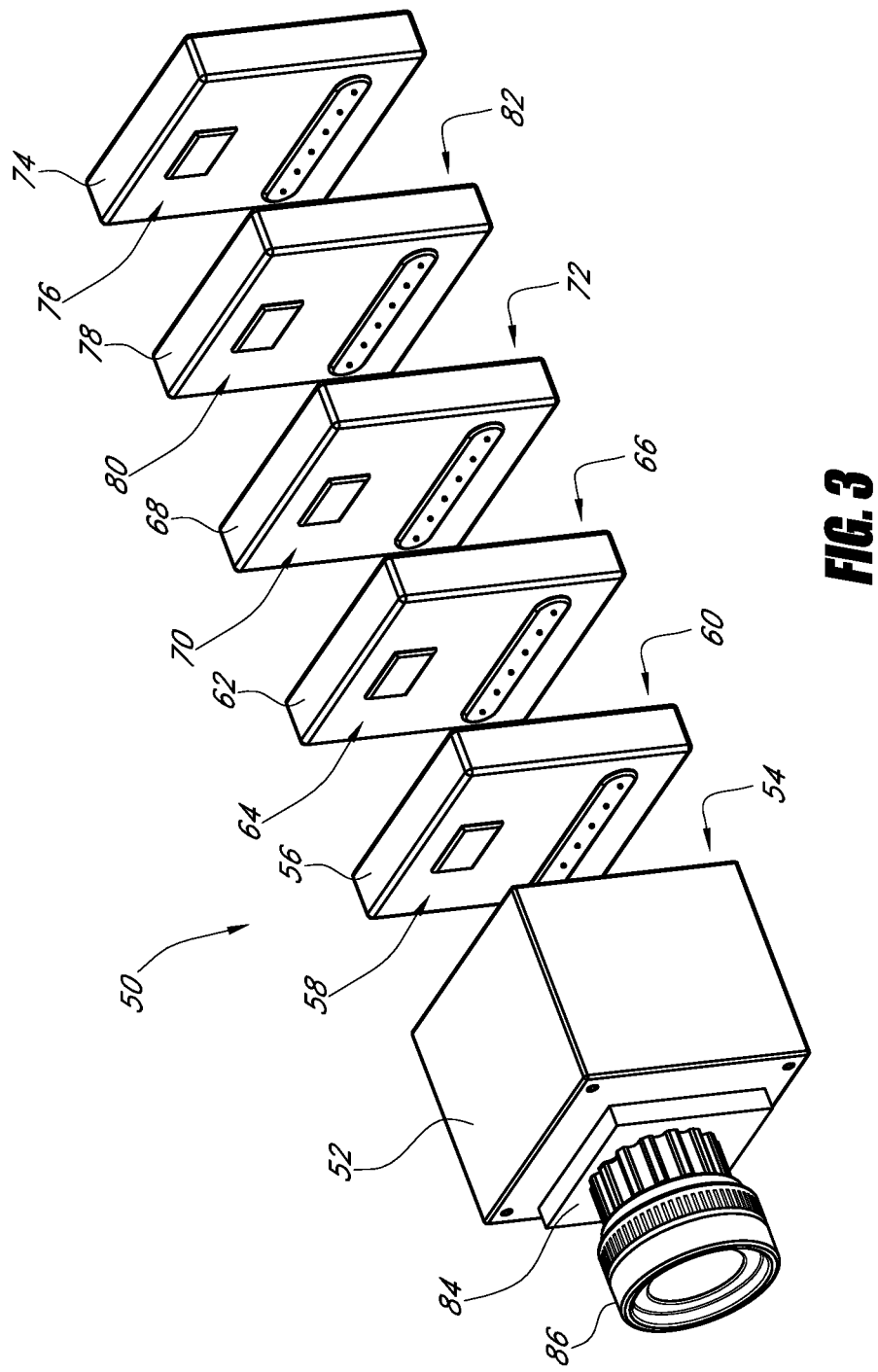
FIG. 3 is a schematic representation of an example configuration of a modular camera system.

Figure 3 schematically illustrates an example modular camera 50 including a sensor module 52 having a first interface 54, a first power module 56 having a second interface 58 and a third interface 60 (not shown), a recording module 62 having a fourth interface 64 and a fifth interface 66 (not shown), an in/out module 68 having a sixth interface 70 and a seventh interface 72 (not shown), a user interface 74 module having an eighth interface 76 and a second power module 78 having a ninth interface 80 and a tenth interface 82. The modular camera system 50 further includes a lens mount module 84 releasably connectable to the sensor module 52, and a lens 86 releasably connectable to the lens mount module 84.

As described, the camera system 10 includes a system bus for communicating electrical signals such as image and other data, control and power, for example. Moreover, as described, the camera system 10 is modular and the modules can generally be arranged in a variety of configurations, including stacked configurations. For example, modules of different types may be stacked between each other. The system bus is advantageously configured to allow for the communication between any subset of modules, regardless of the physical arrangement of the modules on the camera system 10, thereby maintaining the modularity of the camera system 10. For example, the bus is advantageously segmented across the modules in certain embodiments.

The module 30 includes a bus segment (not shown) electrically coupled to the multi-function electrical connector of the first interface 34 and the second interface. Preferably, the design of the bus segment is common across the modules in the camera system 10, thereby advantageously allowing for the transfer of information between any subset of modules and/or other components in the camera system 10 connected to the modules. In one configuration, for example, a power module 24 is stacked between the recording module 20 and the sensor module 12. Although the power module 24 may not itself process, store or otherwise utilize image data, the common bus segment associated with the power module 24 is configured to receive and transmit image data. Image data may therefore be transferred between the sensor module 12 and the recording module 24 through the power module 20. As described herein, other configurations of stacked modules including one or more recording modules 20, user interface modules 22, power modules 24, input/output modules 26 and/or dummy modules are possible.

The segmented system bus is configured to include multiple bus interfaces and generally allows for a high level of flexibility, performance and efficiency. In addition, the system bus is configured to power down one or more of the bus interfaces when they are unused, thereby improving the power efficiency of the bus and improving battery life of the camera system 10.

The system bus includes multiple classes of bus interfaces in certain configurations. In some embodiments, for example, the system bus can include one or more high bandwidth bus interfaces and one or more support bus interfaces. The system bus can also include a common power supply interface which is configured to power the modules. The power supply interface may also be configured to provide power to external devices. Specialized interfaces such as, for example, one or more audio interfaces may be included as well.

Moreover, the segmented system bus of certain embodiments includes multiple types of bus interfaces within the classes. For example, the system bus can include two, three or more types of each of the high-bandwidth, support and specialized interfaces in various configurations.

Providing a variety of bus interface classes and types across the system bus advantageously improves the flexibility, performance and efficiency of the camera system 10 in a variety of ways. For example, different bus interfaces may be better suited to particular purposes. Some modules or external devices may transmit, receive and/or process large amounts of data and may therefore benefit from a particular high-bandwidth bus interface. Other modules or external devices may operate within very low latency parameters and may benefit from a low-latency serial support protocol, for example. Moreover, certain external components may only support particular types of interfaces. As described, the segmented system bus 10 of the modular camera system 10 can be configured to provide a number of bus interface options. Thus, the camera system 10 can be generally interoperable with a wide variety of external devices and modules, enhancing the flexibility of the system 10. In addition, multiple bus interfaces may be available on the segmented bus which are each capable of providing bus functionality within acceptable parameters to a particular module or external device. In such a situation, the system designer or system 10 itself can select the more appropriate bus for communicating with that module or external device. For example, greater speed and/or efficiency may be achieved using a particular available bus interface than with other acceptable bus interfaces also available on the system bus. The system designer or the system 10 itself can select the more appropriate bus, thereby improving performance and efficiency of the system 10.

The high bandwidth bus interfaces may be used by the system 10, for example, for resource intensive tasks such as transferring image data, other types of data, control information, etc. The support bus interfaces may include one or more serial interfaces, for example, and may be used by the system 10 to provide support and control functions, such as, for example, module and peripheral identification and/or control. The support bus interfaces may provide low or zero latency support functions in certain embodiments. The support bus interfaces may be used to perform multi-camera synchronization or control peripheral devices such as lenses or flashes in some configurations. Moreover, the one or more specialized interfaces can provide specialized functions such as for the transmission of audio data, for example.

The high-bandwidth interfaces of the system bus provide can allow for the transfer of large amounts of image and/or control data at relatively high speeds. For example, the high bandwidth bus interface can allow for the transmission of up to 15 GB/s of total bi-directional bandwidth in some embodiments. In one embodiment, the bus implements three high bandwidth interfaces capable of delivering at least about 1 GB/s of data throughput. For example, the bus implements two PCI Express ("PCIe") interfaces, PCIe 2.0 x8 and x1, respectively, and a XAUI based high bandwidth interface. The combined PCIe functionality is therefore capable of delivering from up to about 1 GB/s in a low power mode to about 8 GB/s in a high-performance mode, for example. The PCIe interface can also be configured to implement both the PCIe standard protocol for the OSI Model layers (e.g., physical, transaction and/or data link layers) and other protocols including, for example, variations of the OSI model layers. The XAUI-based high bandwidth interface is capable of delivering up to about 5 GB/s of throughput. In some embodiments, the XAUI interface serves as a monitor and/or general purpose expansion bus and can be scalable. In various embodiments, other high bandwidth bus interfaces may be included such as, for example, InifiniBand®, StarFabric, HyperTransport, RapidIO® or some other bus interface.

As mentioned, a specialized interface may be included as part of the system bus. For example, the specialized interface may provide for the transmission of audio data between the modules of the camera system 10, the other components of the camera system 10 and/or one or more audio peripheral devices. For example, in one embodiment, a time division multiplexed ("TDM") audio interface may be used. In one embodiment, a TDM interface is used which is configured to support up to 16 channels of monaural audio at up to 192 KHz per channel. Moreover, certain parameters may be modified, providing flexibility and interoperability with a variety of audio components. For example, the sample rate and sample width can be adjusted on a channel by channel basis in some embodiments. In various embodiments, specialized interfaces may provide other functions and may allow for the transmission of some other type of data, for example, instead of, or in addition to, audio data.

The one or more support interfaces of one embodiment include three serial interfaces. For example, the support interfaces include an I²C interface, a Serial Peripheral Interface ("SPI") interface and a 1-Wire® interface in one embodiment. These interfaces may be used to provide flexibility in providing a variety of control and support features. For example, the 1-wire® interface of one embodiment is configured to allow the system to quickly identify modules in the system. The 1-wire® interface may act as a common multi-drop bus, for example. A general purpose input/output interface ("GPIO") may also be included. The GPIO interface may provide control functions such as multi-camera synchronization or may provide control for other external devices such as lenses and flashes, for example. In various embodiments, other support interfaces may be implemented such as an RS-232 interface, RS-485 interface, or some other interface.

In addition, a common power supply bus interface provides power to the modules. The power supply bus interface of certain embodiments can beneficially provide power to external devices as well. For example, in one embodiment the power supply can provide current-limited output power to an external motor or some other device, thereby improving the interoperability of the camera system 10 with a variety of devices.

What is claimed is:
1. A modular motion camera, comprising:
a sensor module comprising a surface having a first interface, the sensor module further comprising an image sensor having a horizontal resolution of about 2000 or more pixels, the sensor module configured to convert light received by the image sensor into digital motion picture image data at a rate of at least about 23 frames per second;
a power module, comprising:
a housing including a first surface having a second interface and a second surface having a third interface; and
a bus segment extending from the second interface to the third interface and comprising:
a data bus configured to transmit the motion picture image data having a horizontal resolution of about 2000 or more pixels through the power module at a frame rate of at least about 23 frames per second; and
a power bus configured to transmit power through the power module; and
a recording module, comprising a housing including a first surface having a fourth interface and a second surface having a fifth interface;
wherein the first interface is functionally engageable with any of the second and fourth interfaces,
wherein the third interface is functionally engageable with the fourth interface, and the second interface is functionally engageable with the fifth interface, and wherein the power module is configured to communicate, via the bus segment extending from the second interface to the third interface, the motion picture image data having a horizontal resolution of about 2000 or more pixels, the communicated motion picture image data recorded into the recording module at a frame rate of at least about 23 frames per second.

2. A modular motion camera as in claim 1, wherein the power module includes a recording bus extending between the second and third interface, for transmitting motion picture image data through the power module.

3. A modular motion camera as in claim 1, wherein the recording module includes a power bus extending between the fourth and fifth interface, for transmitting power through the recording module.

4. A modular motion camera as in claim 1, further comprising an in / out module having a sixth and seventh interface; wherein the sixth interface is engageable with the first interface, and the seventh interface is engageable with the second interface.

5. A modular motion camera as in claim 1, further comprising a lens mount module, releasably connectable to a lens mount module interface of the sensor module and having a first type of lens interface, the lens mount module interface also configured for releasable connection with a second lens mount module having a second type of lens interface.

6. A modular motion camera as in claim 1, further comprising a user interface module.

7. A modular motion camera as in claim 6, wherein the user interface module comprises an eighth interface, which is engageable with any of the third and fifth interface.

8. A modular motion camera as in claim 7, wherein the user interface comprises a transceiver for wireless communication with the sensor module.

9. A modular motion camera as in claim 1, further comprising at least a second power module, the second power module having a ninth and tenth interface.

10. A modular motion camera as in claim 9, wherein the second power module comprises a recording bus extending between the ninth and tenth interface, for transmitting motion picture image data through the second power module.

11. A modular motion camera as in claim 9, wherein the second power module comprises a control bus extending between the ninth and tenth interface, for transmitting control signals through the second power module.

12. A modular motion camera as in claim 1, further comprising a digital signal processor in the sensor module.

13. A modular motion camera as in claim 1, wherein the image sensor has a horizontal resolution of about 4000 or more pixels.

14. A modular motion camera as in claim 8, wherein the user interface module comprises:
   a user interface module housing including a first surface having the eight interface; and
   a control interface provided on a second surface of the user interface module housing,
   wherein the user interface is configured to be either:
      physically mounted to the modular motion camera via engagement with either of the third interface of the power module or the fifth interface of the recording module, or
      remotely operated while physically detached from the modular motion camera,
   further wherein the user interface module is usable to control functionality of the modular motion camera in either of the physically mounted and physically detached configurations.

15. A modular motion camera as in claim 1, further comprising at least one additional module, the at least one additional module comprising:
   a first surface having an eleventh interface;
   a second surface having a twelfth interface; and
      a bus segment extending from the eleventh interface to the twelfth interface, the eleventh interface and the twelfth interface comprising complementary interfaces,
   wherein the eleventh interface is functionally engageable with the first interface and the twelfth interface is functionally engageable with any of the second and fourth interfaces,
   wherein the at least one additional module is configured to communicate, via the bus segment extending from the eleventh interface to the twelfth interface, the motion picture image having a horizontal resolution of about 2000 or more pixels at a rate of at least about 23 frames per second, and
   wherein the at least one additional module is substantially free of electronics other than electronics associated with the bus segment of the at least one additional module.

* * * * *

UNITED STATES PATENT AND TRADEMARK OFFICE
CERTIFICATE OF CORRECTION

PATENT NO.       : 8,525,924 B2
APPLICATION NO. : 12/345437
DATED            : September 3, 2013
INVENTOR(S)      : James H. Jannard It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 642 days.

Signed and Sealed this
Twenty-third Day of May, 2017

Michelle K. Lee
*Director of the United States Patent and Trademark Office*